United States Patent
Xu et al.

(10) Patent No.: US 9,935,913 B2
(45) Date of Patent: Apr. 3, 2018

(54) ESTABLISHING CONNECTIONS BETWEEN THIRD PARTY ACCOUNTS MAINTAINED BY VARIOUS THIRD PARTY SYSTEMS AND BETWEEN THIRD PARTY ACCOUNTS AND ACCOUNTS MAINTAINED BY AN ONLINE SYSTEM

(71) Applicant: Facebook, Inc., Menlo Park, CA (US)

(72) Inventors: Liang Xu, Bellevue, WA (US); Zhonghua Qu, Redmond, VA (US); Aleksey Sergeyevich Fadeev, Seattle, WA (US); Artur Abdullin, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 140 days.

(21) Appl. No.: 15/179,935

(22) Filed: Jun. 10, 2016

(65) Prior Publication Data

US 2017/0359293 A1 Dec. 14, 2017

(51) Int. Cl.
*G06F 15/173* (2006.01)
*H04L 12/58* (2006.01)
*H04L 29/08* (2006.01)
*H04L 29/06* (2006.01)

(52) U.S. Cl.
CPC .......... *H04L 51/32* (2013.01); *H04L 65/1069* (2013.01); *H04L 67/306* (2013.01)

(58) Field of Classification Search
USPC .................. 709/206; 707/758, 725; 715/753; 705/7.29
See application file for complete search history.

(56) References Cited

U.S. PATENT DOCUMENTS

| | | | | |
|---|---|---|---|---|
| 8,787,707 B1* | 7/2014 | Steves | .................... | G06Q 30/02 382/181 |
| 9,177,225 B1* | 11/2015 | Cordova-Diba | .......... | G06T 5/00 |
| 9,317,778 B2* | 4/2016 | Cordova-Diba | .. | G06F 17/30247 |
| 9,706,515 B1* | 7/2017 | Chadwick | ............. | H04W 64/00 |
| 2011/0261049 A1* | 10/2011 | Cardno | ................... | G06Q 10/10 345/419 |
| 2012/0150888 A1* | 6/2012 | Hyatt | ................. | G06F 17/30528 707/758 |
| 2014/0237386 A1* | 8/2014 | Barrington | ............ | H04L 65/403 715/753 |

(Continued)

*Primary Examiner* — Tammy Nguyen
(74) *Attorney, Agent, or Firm* — Fenwick & West LLP

(57) ABSTRACT

Online system users interact with one or more third party systems, with the online system maintaining an account for each of its users and each third party system maintaining a third party account for each of its users. The online system compares information in a user's account to accessible information in third party accounts and establishes connections between the user's account and third party accounts based on the comparisons, a connection including a confidence level indicating a likelihood of a third party account being associated with the user of the online system corresponding to the user's account. Similarly, the online system compares information in different third party accounts and establishes connections between different third party accounts based on the comparisons including includes a confidence level indicating a likelihood of a third party account and an additional third party account being associated with the same user.

18 Claims, 4 Drawing Sheets

(56) References Cited

U.S. PATENT DOCUMENTS

| | | | |
|---|---|---|---|
| 2015/0294327 A1* | 10/2015 | Steves | G06Q 30/0224 |
| | | | 705/7.29 |
| 2016/0179968 A1* | 6/2016 | Ormseth | G06F 17/30867 |
| | | | 707/725 |
| 2016/0277368 A1* | 9/2016 | Narayanaswamy | |
| | | | G06F 21/6218 |
| 2017/0078304 A1* | 3/2017 | Zhou | H04L 63/105 |
| 2017/0118240 A1* | 4/2017 | Devi Reddy | G06N 7/005 |
| 2017/0206272 A1* | 7/2017 | Neela | G06F 17/30707 |
| 2017/0264619 A1* | 9/2017 | Narayanaswamy | H04L 63/105 |
| 2017/0264640 A1* | 9/2017 | Narayanaswamy | H04L 63/20 |
| 2017/0286914 A1* | 10/2017 | Fang | G06Q 10/1053 |
| 2017/0359293 A1* | 12/2017 | Xu | H04L 51/32 |

* cited by examiner

ESTABLISHING CONNECTIONS BETWEEN THIRD PARTY ACCOUNTS MAINTAINED BY VARIOUS THIRD PARTY SYSTEMS AND BETWEEN THIRD PARTY ACCOUNTS AND ACCOUNTS MAINTAINED BY AN ONLINE SYSTEM

BACKGROUND

This disclosure relates generally to online systems, and more specifically to identifying accounts maintained by different online systems corresponding to a common user.

Online systems, such as social networking systems, allow users to connect to and communicate with other users of the online system. Users create profiles on an online system that are tied to their identities and include information about the users, such as interests and demographic information. The users may be individuals or entities such as corporations or charities. Because of the increasing popularity of online systems, and the significant amount of user-specific information maintained by online systems, an online system allows users to easily communicate information about themselves to other users and share content with other users. For example, an online photo and video sharing system generates content feeds for presenting photos and videos uploaded by its users to other users. In addition to photos and videos, other types of content uploaded and shared by online system users may be presented, such as stories describing actions performed by online system users, status updates, event announcements, activity invitations, location check-ins, or any other suitable information.

Multiple online systems may maintain information about a user describing the user to each online system and identifying actions performed by the user with each online system. Additionally, certain online systems may exchange information, such as information associated with users subject to privacy settings and other regulations, with each other. This allows an online system to leverage information maintained by another online system to improve content provided to a user or to provide additional functionality. However, different online systems typically associate different identifying information with a user, so an identifier associated with the user by an online system differs from an identifier associated with the user by another online system. An online system typically does not allow another online system to access certain information used by the online system to identify a user, use of different information identifying a user by different online systems may prevent an online system from obtaining information about the user from another online system with which the online system is authorized to exchange information.

SUMMARY

An online system maintains accounts associated with various users. Each account is associated with a user and an identifier allowing the online system to identify an account, which includes information associated with a user. For example, an account includes a user profile including demographic information or other information associated with a user, and may include information identifying actions performed by the user or connections between the user and other users of the online system. Based on information included in a user's account, the online system may identify content for presentation to the user.

Users of the online system may also interact with various third party systems external to the online system. For example, a user receives content from various third party systems other than the online system. Third party systems may maintain third party accounts associated with users who interact with or receive content from the third party systems. A third party system associates a third party identifier with each third party account to identify each third party account, which includes information associated with a user of the third party system that is maintained by the third party system.

In various embodiments, one or more third party systems and the online system exchange information with each other. Hence, the online system may obtain information from one or more of the third party systems, which may obtain information from the online system. Similarly, different third party systems may obtain information from each other. The online system may maintain information identifying third party systems with which the online system is capable of exchanging information, such as a list including identifiers of third party systems with which the online system is authorized to exchange information. Similarly, a third party system may maintain information identifying additional third party systems or the online system to indicate the third party system is capable of exchanging information with the additional third party systems or with the online system. While the online system and third party systems may exchange information with each other, the online system often associates identifiers with accounts maintained by the online system that differ from third party identifiers associated with third party accounts maintained by a third party system. Different third party systems that are capable of exchanging information with each other also often associate different third party identifiers with third party accounts maintained by the different third party systems. This different identification of accounts and third party accounts by the online system and various third party systems, respectively, may prevent the online system obtaining certain information about users of the online system that is included in third party accounts maintained by various third party systems instead of included in an account maintained by the online system or prevent a third party system from obtaining certain information about users maintained by third party accounts maintained by additional third party systems.

To associate certain information from third party accounts associated with a user having an account maintained by the online system but maintained by various third party systems, the online system establishes connections between accounts maintained by the online system and third party accounts maintained by one or more third party systems. The online system also establishes connections between third party accounts maintained by different third party systems, allowing a third party system to associate information in a third party account maintained by the third party system with an additional third party account maintained by an additional third party system. In various embodiments, the online system identifies third party systems with which the online system is authorized to obtain information and retrieves information from various third party accounts maintained by the identified third party systems. Similarly, the online system may identify third party system authorized to exchange information with each other and retrieve information from third party accounts maintained by the identified third party systems. For example, the online system includes information identifying a set of third party systems and retrieves third party accounts from each of the third party systems in the set. In some embodiments, the online system retrieves third party accounts maintained by third party systems that are associated with a common entity as the online system, third party accounts maintained by third party systems having relationships with the online system authorizing information to be exchanged between the third party systems and the online system, or third party systems associated with a common entity.

Based on information included in accounts maintained by the online system and information included in various third party accounts by third party systems, the online system establishes connections between one or more accounts maintained by the online system and one or more of the third party accounts. Additionally, the third party system may establish connections between third party accounts maintained by a third party system and one or more additional third party accounts maintained by additional third party systems based on information included in third party accounts. For example, the online system compares information included in accounts maintained by the online system to information included in third party accounts that the online system is authorized to access by third party systems and applies one or more rules to the comparisons to establish connections between third party accounts and accounts maintained by the online system. As an example, one or more rules applied by the online system establish a connection between an account maintained by the online system and a third party account if certain types of information included in the account maintained by the online system have values matching values of the certain types of information included in the third party account. The online system may use various methods to establish connections between accounts maintained by the online system and one or more third party accounts, with different methods comparing different information included in the account maintained by the online system and in one or more third party accounts. Hence, the online system establishes connections between various accounts maintained by the online system and third party accounts maintained by various third party systems. For example, the online system establishes connections between each account maintained by the online system and one or more third party accounts maintained by one or more third party systems.

Additionally, the online system may compare information included in third party accounts maintained by different third party systems capable of exchanging information with each other and applies one or more rules to the comparisons to establish connections between third party accounts maintained by different third party systems. As an example, one or more rules applied by the online system establish a connection between a third party account maintained by a third party system and an additional third party account maintained by an additional third party system if certain types of information included in the third party account maintained by the third party system have values matching values of the certain types of information included in the additional third party account maintained by the additional third party system. The online system may use various methods to establish connections between third party accounts maintained by different third party systems, with different methods comparing different information included in different third party accounts. Hence, the online system may establish connections between various third party accounts maintained by different third party systems.

A connection between an account maintained by the online stems and a third party account maintained by a third party system or between third party accounts maintained by different third party systems includes a confidence level determined by the online system. The confidence level provides a measure of a likelihood of the third party account being associated with a user associated with the account (i.e., a likelihood of the account and the third party account being associated with the same user or entity) maintained by the third party system or provides a measure of a likelihood of the third party account being associated with a user associated with an additional third party account. In various embodiments, the confidence level is based on a type or an amount of information having a common value in both the account maintained by the online system and in the third party account or having a common value in both the third party account and in the additional third party account. For example, higher confidence levels are included in connections between accounts and third party accounts having larger amounts of matching information or in connections between different third party accounts maintained by different third party systems having larger amounts of matching information. As another example, higher confidence levels are included in connections between accounts and third party accounts having certain types of information with matching values or in connections between different third party systems maintained by different third party systems having certain types of information with matching values. Additionally, a method used to establish a connection between an account maintained by the online system and a third party account maintained by a third party system or between third party accounts maintained by different third party systems may influence the confidence level included in a connection, with certain methods resulting in higher confidence values included in the connection. The confidence level included in a connection between an account and a third party account or between different third party accounts may also include information describing the connection, such as an identifier of a method used to establish the connection or the types of information having matching values in the account and in the third party account or in the different third party accounts. Additionally, the confidence level included in a connection may be modified over time by the online system; for example, the online system applies a decay factor to the confidence level that reduces the confidence value as time lapses from establishment of the connection including the confidence level.

Based on the confidence levels included in various connections between accounts maintained by the online system and third party accounts maintained by third party systems or between third party accounts maintained by different third party systems, the online system generates one or more clusters including one or more accounts maintained by the online system or third party accounts maintained by third party systems. A cluster includes a third party account and additional third party accounts associated with a user associated with the third party account or includes an account maintained by the online system and third party accounts associated with a user associated with the account maintained by the online system. Hence, accounts maintained by the online system and third party accounts included in a cluster are associated with a common user, or third party accounts included in a cluster are associated with a common user. In various embodiments, the online system may apply any suitable clustering method to the established connections to generate the one or more clusters, so a cluster includes accounts or third party accounts that are similar to each other.

If the online system receives information describing actions performed by a user of the online system, the online system may provide information describing the actions to one or more third party systems maintaining third party accounts included in a cluster including an account maintained by the online system for the user. This allows the third party systems to maintain additional information in various third party accounts. Similarly, if a third party system receives information describing an action performed by a user associated with a third party account maintained by the third party system, the third party system may communicate information describing the action to additional third party systems maintaining additional third party accounts included in the cluster that includes the third party account or to the online system, if an account maintained by the online system is included in the cluster that includes the third party account. Communication of information to other systems maintaining accounts included in a cluster that includes an account for a user maintained by a system allows the other systems to more accurately identify actions performed by users, allowing the other systems to more accurately leverage actions performed by users when providing content to the users.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
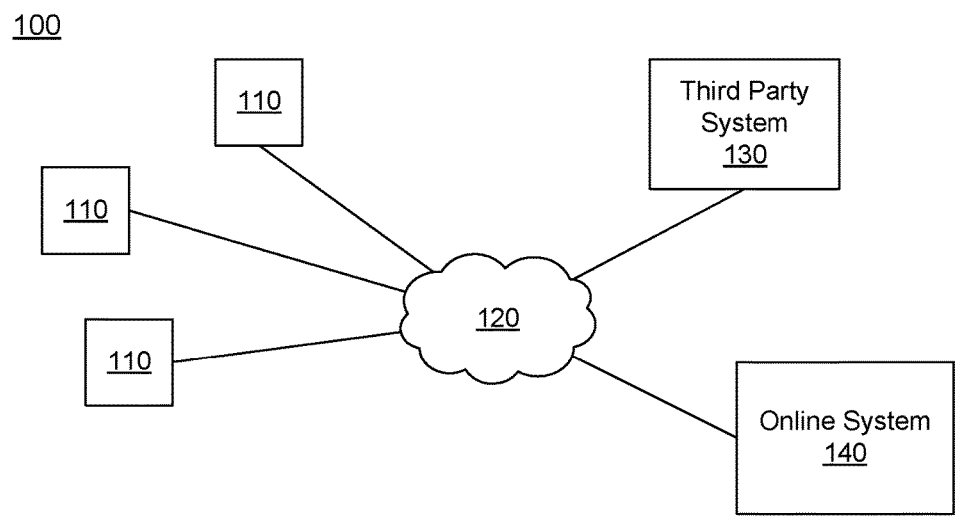
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Various third party systems 130 each maintain accounts associated with users of the third party systems 130. In various embodiments, a third party system 130 maintains a third party account associated with each user of the third party system 130. Each third party account maintained by a third party system 130 is associated with a unique third party identifier, allowing the third party system 130 to identify or to retrieve a third party account based on its third party identifier. Different third party systems 130 may use different third party identifiers for identifying accounts. For example, a third party system 130 associates a device identifier of a client device 110 from which a request to create a third party account was received with a third party account, while another third party system 130 generates information associated with the third party account, stores the generated information, and communicates the generated information to a client device 110 associated with a user, which stores the generated information; for example, the generated information is included in a cookie stored by the client device 110. When the client device 110 communicates with the third party system 130, the client device 110 communicates the generated information that was stored on the client device 110 to the third party system 130 to identify a third party account associated with generated information matching the generated information that was stored on the client device 110 (e.g., identifies a third party account associated with information matching information included in a cookie stored on the client device 110). However, a third party system 130 may associate any suitable information capable of uniquely identifying a third party account with the third party account.

Any suitable information associated with a user of a third party system 130 may be included in a third party account associated with the user that is maintained by the third party system 130. For example, a third party account associated with a user by a third party system 130 includes demographic information associated with the user. As another example, the third party account associated with a user by a third party system 130 includes identifiers of content items presented to the user by the third party system 130 or content items presented to the user by the third party system 130 with which the user interacted.

Figure 2:
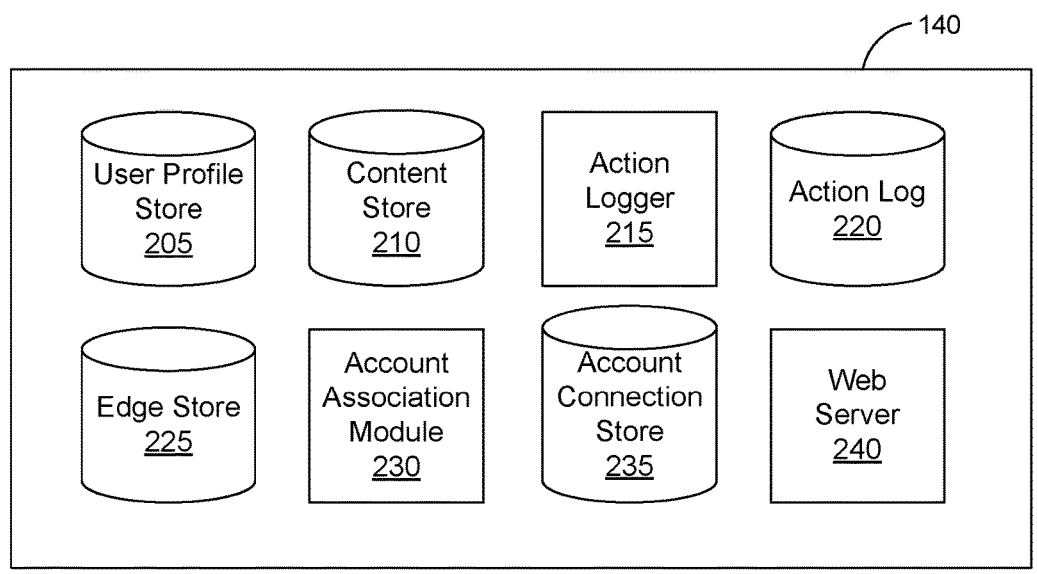
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an account association module 230, an account connection store 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image, with information identifying the images in which a user is tagged stored in the user profile of the user. A user profile in the user profile store 205 may also maintain references to actions by the corresponding user performed on content items in the content store 210 and stored in the action log 220.

Each user profile included in the user profile store 205 is associated with an account maintained by the online system 140. The account is associated with an identifier that uniquely identifies the account, allowing the online system 140 to identify a user profile when an identifier associated with an account. In some embodiments, the online system 140 generates an identifier for an account when the online system 140 creates a user profile. For example, the online system 140 generates numeric data, text data, or alphanumeric data associated with an account that uniquely identifies the account when initially creating a user profile associated with the account. As another example, the online system 140 uses information included in a user profile associated with the account to generate an identifier associated with the account. For example, the online system 140 uses identifying information associated with a user included in a user account (e.g., an e-mail address, a phone number, etc.) as the identifier of an account associated with the user profile.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences. For example, an identifier associated with an account of a user is associated with information describing actions performed by the user, allowing the online system 140 to determine interests or preferences of the user based on actions performed by the user.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, a rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The account association module 230 selects a user account maintained by the online system 140 and retrieves information from various third party accounts maintained by third party systems 130 that communicate with the online system 140. For example, the account association module 230 includes information identifying a set of third party systems 130 and retrieves third party accounts from each of the third party systems 130 in the set. In some embodiments, the account association module 230 retrieves third party accounts maintained by third party systems 130 that are associated with a common entity as the online system 140 or third party accounts maintained by third party systems 130 having relationships with the online system 140 authorizing information to be exchanged between the third party systems 130 and the online system 140. In other embodiments, the account association module 230 retrieves third party accounts maintained by third party system 130 associated with a common entity or that have relationships authorizing information to be exchanged between the third party systems 130. As further described below in conjunction with FIGS. 3-5, based on information included in accounts maintained by the online system 140 and information included in various third party accounts maintained by third party systems 130, the account association module 230 establishes connections between the third party accounts and accounts maintained by the online system 140 and connections between third party accounts maintained by various third party systems 130. For example, the account association module 230 compares information included in an account maintained by the online system 140 to information included in a third party account that the online system 140 is authorized by the third party system 130 to access and applies one or more rules to the comparison to establish a connection between the account maintained by the online system 140 and the third party account. Similarly, the account association module 230 compares information included in different third party accounts and applies one or more rules to the comparison to establish a connection between the third party accounts. As an example, one or more rules applied by the account association module 230 establish a connection between an account maintained by the online system 140 and a third party account (or between different third party accounts) if certain types of information included in the account have values matching values of the certain types of information included in the third party account (or if certain types of information included in different third party accounts match). The account association module 230 may use various methods to establish connections between an account maintained by the online system 140 and one or more third party accounts or between different third party accounts, as further described below in conjunction with FIG. 3. In various embodiments, the account association module 230 selects various accounts maintained by the online system 140 and establishes connections between each of the various accounts and third party accounts maintained by various third party systems 130. For example, the account association module 230 establishes connections between each account maintained by the online system 140 and one or more third party accounts maintained by one or more third party systems 130. In some embodiments, the account association module 230 establishes connections between various third party accounts maintained by different third party systems 130.

A connection between an account maintained by the online system 140 and a third party account maintained by a third party system 130, or between third party accounts maintained by different third party systems 130, includes a confidence level determined by the account association module 230. The confidence level provides a measure of a likelihood of the third party account being associated with a user associated with the account maintained by the online system 140 (i.e., a likelihood of the account and the third party account being associated with the same user or entity) or a likelihood of a third party account maintained by a third party system 130 being associated with a user associated with an additional third party account maintained by an additional third party system 130. In various embodiments, the confidence level is based on a type or an amount of information having a common value in both the account and in the third party account or in both the third party account and in the additional third party account. For example, higher confidence levels are included in connections between accounts and third party accounts, or between different third party accounts, having larger amounts of matching information. As another example, higher confidence levels are included in connections between accounts and third party accounts, or between different third party accounts, having certain types of information with matching values. Additionally, a method used by the account association module 230 to establish a connection between an account maintained by the online system 140 and a third party account maintained by a third party system 130 or between third party accounts maintained by different third party systems 130 may be included in a connection, with certain methods resulting in higher confidence values included in a connection. In some embodiments, the account association module 230 does not establish a connection between an account and a third party account or between different third party accounts unless the confidence level included in the connection equals or exceeds a threshold value; hence, the account association module 230 may prevent storage of information identifying connections between an account and a third party account, or between different third party accounts, having less than a threshold likelihood of being associated with the same user as the account, or as the other third party account, in some embodiments. The confidence level included in a connection between an account and a third party account, or between different third party accounts, may also include information describing the connection, such as an identifier of a method used by the account association module 230 to establish the connection or the types of information having matching values in the account and in the third party account or having matching values in third party accounts maintained by different third party systems 130.

Additionally, the account association module 230 includes one or more rules regulating access by the online system 140 to information maintained by various third party systems 130, regulating access by various third party systems 130 to information maintained by the online system 140, or regulating access by various third party system 130 to information maintained by other third party systems 130. For example, one or more rules identify specific types of information included in third party accounts maintained by a third party system 130 that the online system 140 is authorized by the third party system 130 to obtain; alternatively, one or more rules identify specifies types of information included in third party accounts maintained by a third party system 130 that the online system 140 is prevented from accessing. In another example, the account association module 230 includes one or more rules identifying types of information included in third party accounts maintained by a third party system 130 that a different third party system 130 is authorized to access or identifying types of information included in third party accounts maintained by the third party system that the different third party system 130 is not authorized to access. Similarly, one or more rules may identify information included in accounts that the online system 140 permits or prevents a third party system 130 from accessing. The online system 140 may specify different rules for different third party systems 130, so different third party systems 130 may access different types of information included in accounts maintained by the online system 140. Similarly, a third party system 130 may provide different rules for different additional third party systems 130 to the account association module 230, so different additional third party systems 130 may access different types of information included in third party accounts maintained by the third party system 130.

Based on the confidence levels included in various connections between accounts maintained by the online system 140 and third party accounts maintained by third party systems 130 or between third party accounts maintained by different third party systems 130, the account association module 230 generates one or more clusters that each include one or more accounts maintained by the online system 140 or third party accounts maintained by third party systems 130. A cluster includes a third party account associated with a user and additional third party accounts associated with the user associated with the third party account, and may also include an account maintained by the online system 140 associated with the user associated with the third party account. Similarly, a cluster may include an account maintained by the online system 140 and one or more third party accounts associated with a user associated with the account maintained by the online system 140. Hence, a cluster includes third party accounts associated with a common user, and may include an account maintained by the online system 140 that is also associated with the common user. To generate the one or more clusters, the account association module 230 may apply any suitable clustering method to the connections between third party accounts and between accounts maintained by the online system 140 that is based on confidence levels include in connections between third party accounts or between third party accounts and accounts maintained by the online system 140. In various embodiments, the online system may apply any suitable clustering method to the established connections to generate the one or more clusters, so a cluster includes accounts or third party accounts that are similar to each other. For example, the account association module 230 applies one or more graph based cluster models to the connections between third party accounts or between third party accounts and accounts maintained by the online system 140 to generate the one or more clusters.

The account association module 230 retrieves information from one or more third party accounts connected to an account maintained by the online system 140 subject to one or more rules limiting access by the online system 140 to information included in various third party accounts. Additionally, the account association module 230 provides information describing actions performed by a user and received by the online system 140 or by a third party system 130 to additional third party systems 130 maintaining third party accounts associated with the user who performed the action, allowing the additional third party systems 130 to receive information describing actions by the user identified by the online system 140 or by the third party system 130. Communication of information to third party systems 130 maintaining third party accounts included in a cluster allows different third party systems 130 maintaining third party accounts included in the cluster to more accurately identify actions performed by a user associated with the third party accounts in the cluster, which may improve selection of content for presentation to the user by various third party systems 130. Similarly, obtaining information from third party systems 130 maintaining third party accounts included in a cluster including an account maintained by the online system 140 allows the online system 140 to leverage information captured by third party systems 130 maintaining third party accounts associated with the user corresponding to the account maintained by the online system 140 to improve content provided by the online system 140 to the user.

In various embodiments, the account connection store 235 includes information describing connections between accounts maintained by the online system 140 and third party accounts maintained by one or more third party systems 130 established by the account association module 230, as well as information describing connections between third party accounts maintained by different third party systems 130 established by the account association module 230. For example, the account connection store 235 stores an identifier of an account maintained by the online system 140, a third party identifier of a third party account, and a confidence level of a connection between the account and the third party account. As another example, the account connection store 235 stores a third party identifier of a third party account, an additional third party identifier of an additional third party account, and a confidence level of a connection between the third party account and the additional third party account. Additional information, such as a time when a connection between a third party account and an account, or between third party accounts, was established may also be stored in the account connection store 235 along with a third party identifier of the third party account and an identifier of the account or along with third party identifiers of different third party accounts. The account connection store 235 also maintains information identifying various clusters generated by the account association module 230. For example, the account connection store 235 stores a cluster identifier in association with one or more third party identifiers of third party accounts included in the cluster; if the cluster includes an account maintained by the online system 140, the account connection store 235 associates an identifier of the account in association with the cluster identifier. In various embodiments, the account association module 230 updates the information in the account connection store 235 at various times. For example, the account association module 230 periodically updates information included in the account connection store 235.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
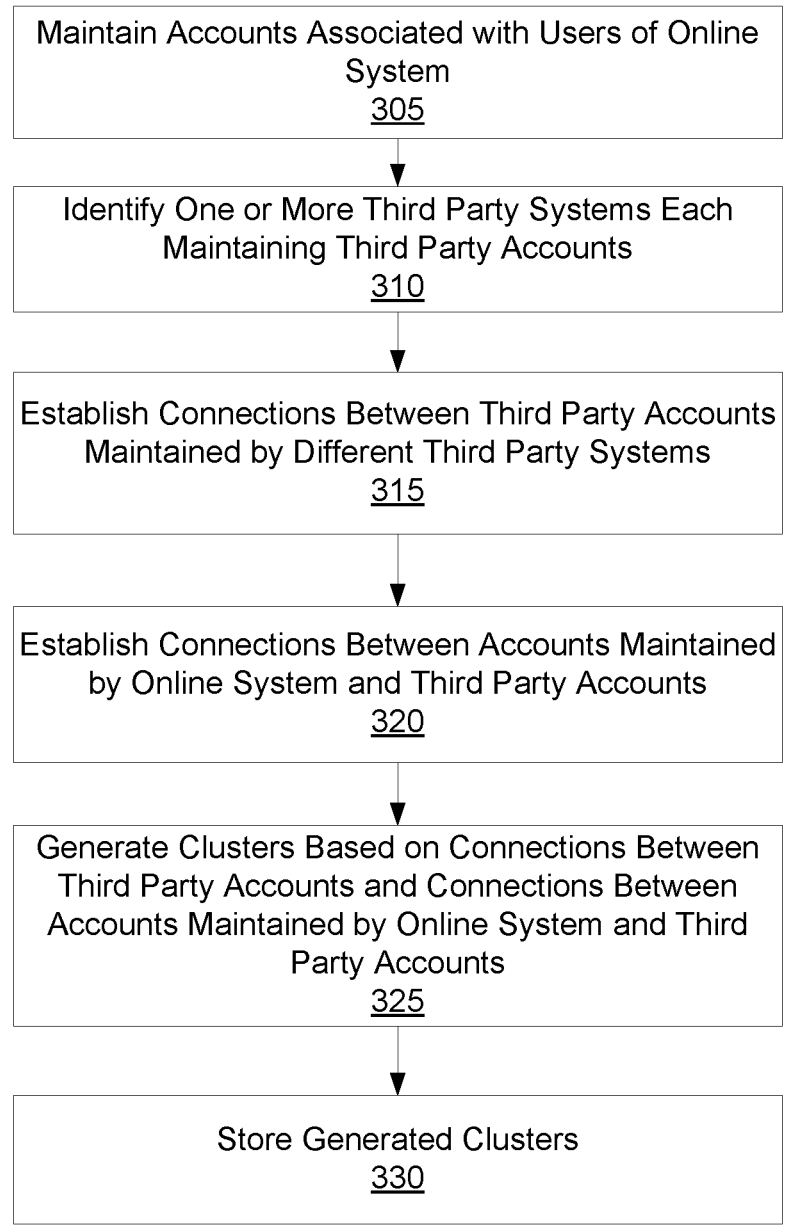
FIG. 3 is a flowchart of a method for identifying accounts maintained by one or more third party systems or by an online system that are associated with a common user, in accordance with an embodiment.

Establishing Connections Between Accounts Maintained by an Online System and Third Party Accounts Maintained by Third Party Systems FIG. 3 is a flowchart of one embodiment of a method for identifying third party accounts maintained by one or more third party systems 130 or accounts maintained by an online system 140 associated with a common user. In various embodiments, the method may include different and/or additional steps than those described in conjunction with FIG. 3. Additionally, in some embodiments, steps of the method may be performed in different orders than the order described in conjunction with FIG. 3.

The online system 140 maintains 305 accounts associated with various users. Each account is associated with a user and an identifier allowing the online system 140 to identify an account. Information associated with the user is included in the user's account. For example, as described above in conjunction with FIG. 2, an account includes a user profile associated with a user, and may include information identifying actions performed by the user or connections between the user and other users of the online system 140. The online system 140 retrieves information from an account associated with a user and determines content for presentation to the user based at least in part on the retrieved information in various embodiments.

Additionally, the online system 140 identifies 310 one or more third party systems 130 that each maintain third party accounts associated with users of the one or more third party systems 130. For example, a third party account maintained by a third party system 130 includes information associated with a user of the third party system 130 by the third party system 130. Each third party account is associated with an identifier by a third party system 130 on which a third party account is maintained, allowing the third party system 130 to retrieve information included in the third party account. In various embodiments, the online system 140 maintains information identifying 310 one or more third party systems 130 authorized to exchange information with the online system 140. For example, the online system 140 stores a table or list identifying third party systems 130 with which the online system 140 may exchange information and vice versa. In other embodiments, the online system 140 maintains information 310 identifying third party systems 130 that authorize the online system 140 to access information maintained by the third party systems 130. Alternatively, the online system 140 communicates a request to exchange information to various third party systems 130 and identifies 310 one or more third party systems 130 from which the online system 140 receives a response to the request indicating the online system 140 may obtain information from the one or more third party systems 130.

While the online system 140 and identified third party systems 130 may exchange information with each other, certain information maintained by the online system 140 or by various identified third party systems 130 is not authorized to be exchanged. For example, account identifiers used by the online system 140 are not authorized to be exchanged with the identified third party systems 130. As another example, third party identifiers used by a third party system 130 are not authorized to be exchanged with another third party system 130. Additionally, the online system 140 and various third party systems 130 associate different identifiers and third party identifiers with, respectively, accounts and with third party accounts maintained by the online system 140 and by the various third party systems 130, respectively, preventing the online system 140 from readily obtaining certain information included in third party accounts maintained by various third party systems 130 and preventing a third party system 130 from readily obtaining certain information included in third party accounts maintained by other third party systems 130.

Figure 4:
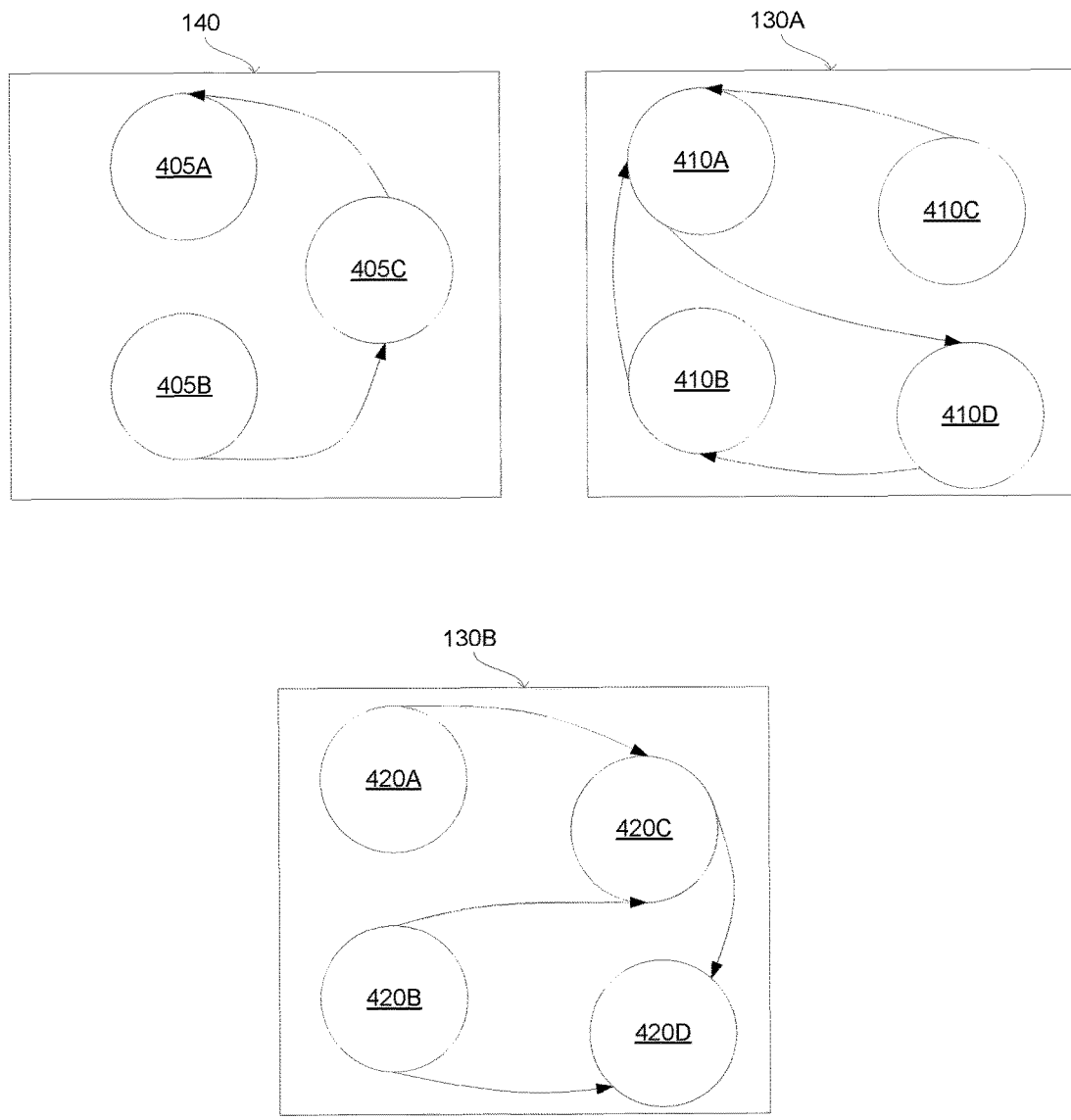
FIG. 4 is a conceptual diagram of accounts maintained by an online system and third party accounts maintained by third party systems, in accordance with an embodiment.

FIG. 4 shows a conceptual diagram of accounts maintained by an online system 140 and third party accounts maintained by third party systems 130A, 130B. In the example of FIG. 4, the online system 140 maintains accounts 405A, 405B, 405C. A different identifier is associated with each of the accounts 405A, 405B, 405C to allow the online system 140 to retrieve information from various accounts 405A, 405B, 405C. In the example of FIG. 4, the online system 140 also maintains connections between one or more of the accounts 405A, 405B, 405C; for example, the online system 140 maintains a connection between account 405A and account 405C.

Similarly, third party system 130A maintains third party accounts 410A, 410B, 410C, 410D, and third party system 130B maintains third party accounts 420A, 420B, 420C, 420D. Third party system 130A associates different third party identifiers with each of third party account 410A, 410B, 410C, 410D, while third party system 130B associates a unique third party identifier with each of third party account 420A, 420B, 420C, 420D. In the example of FIG. 4, third party system 130A maintains connections between various third party accounts 410A, 410B, 410C, 410D, and third party system 130B also maintains connections between various third party accounts 420A, 420B, 420C, 420C; however, in various embodiments, connections are not maintained between various third party accounts or between accounts maintained by the online system 140.

In the example of FIG. 4, the identifiers associated with accounts 405A, 405B, 405C differ from the third party identifiers associated with the third party accounts 410A, 410B, 410C, 410D and from the third party identifiers associated with the third party accounts 420A, 420B, 420C, 420D. Similarly, the third party identifiers associated with the third party accounts 410A, 410B, 410C, 410D differ from the third party identifiers associated with the third party accounts 420A, 420B, 420C, 420D. For example, the online system 140 associates a user identifier with each of account 405A, 405B, 405C, while third party system 130A associates a device identifier with each of third party account 410A, 410B, 410C, 410D, and third party system 130B associates a cookie with each of third party account 420A, 420B, 420C, 420D. Hence, accounts maintained by the online system 140 and third party accounts maintained by different third party systems 130A, 130B are differently identified by the online system 140 and by the different third party system 130A, 130B, respectively. For purposes of illustration, the online system 140 does not allow a third party system 130 to access identifiers of accounts 405A, 405B, 405C maintained by the online system, while a third party system 130A does not allow another third party system 130B or the online system 140 to access third party identifiers of third party accounts 410A, 410B, 410C, 410D maintained by the third party system 130A. The third party system 130B similarly does not allow another third party system 130A or the online system 140 to access third party identifiers of third party accounts 420A, 420B, 420C, 420D.

Referring back to FIG. 3, to allow the online system 140 to obtain information about a user of the online system 140 from third party accounts maintained by one or more of the identified third party systems 130 or to allow a third party system 130 to obtain information about a user of the third party system 130 from third party accounts maintained by one or more additional third party systems 130 or from an account maintained by the online system 140, the online system 140 establishes 315 connections between third party accounts maintained by different third party systems 130 and between third party accounts. Additionally, the online system 140 establishes 320 connections between third party accounts maintained by different third party vendors and accounts maintained by the online system 140 in various embodiments.

To establish 315 connections between third party accounts maintained by different third party systems 130, the online system 140 retrieves information associated with a third party account maintained by a third party system 130 and compares the retrieved information to information associated with one or more additional third party accounts maintained by one or more additional third party systems 130. In one embodiment, the online system 140 retrieves information associated with a third party account identified by a third party system 130 and obtains information associated with one or more additional third party accounts maintained by one or more additional third party system 130. For various additional third party accounts maintained by additional third party systems 130, the online system 140 compares information associated with the third party account maintained by the third party system 130 to information associated with an additional third party account maintained by an additional third party system 130. The additional third party system 130 authorizes the online system 140 to access information maintained by the additional third party system 130 or authorizes the third party system 130 to access information maintained by the additional third party system 130. Based on the comparison, the online system 140 establishes 315 a connection between the third party account maintained by the third party system 130 and the additional third party account maintained by the additional third party system 130. The established connection includes a confidence level of the user associated with the third party account maintained by the third party system 130 matching a user associated with the additional third party account maintained by the additional third party system 130. Hence, the confidence level provides a measure of a likelihood of the user associated with the third party account maintained by the third party system 130 being the same individual or entity as the user associated with the additional third party account maintained by the additional third party system 130. In some embodiments, the online system 140 does not establish 315 a connection between the third party account maintained by the third party system 130 and an additional third party account maintained by an additional third party system 130 unless the confidence level of the connection equals or exceeds a threshold value; hence, the online system 140 may not establish 315 connections between a third party account and additional third party accounts having less than a threshold likelihood of being associated with the same user as the selected account.

In addition to establishing 315 a connection between a third party account maintained by a third party system 130 and an additional third party account maintained by an additional third party system 130 by applying rules to a comparison between information in the third party account and information in the additional third party account, the online system 140 may establish 315 a connection between the third party account and the additional third party account by applying rules that are based on a comparison of information included in the third party account and information included in the additional third party account that is accessible to the online system 140. The online system 140 is authorized to access a subset of information in the third party account and in the additional third party account, so the online system 140 compares the subset of information included in the third party account to the subset of information included in the additional third party account establishes 315 a connection between the third party account and the additional third party account based on the comparison, with the confidence level included in the connection based at least in part on the comparison. For example, certain types of information included in a third party account are capable of uniquely identifying the account, so the online system 140 establishes 315 a connection between the third party account and the additional third party account having greater than a threshold confidence level if a value of the certain type of information included in the third party account matches a value of the certain type of information included in the subset of information included in the additional third party account accessible to the online system 140.

Additionally, the amount or percentage of information included in the third party account matching information included in the subset of information from the additional third party account that is accessible to the online system 140 determines the confidence level of the connection between the third party account and the additional third party account in various embodiments. For example, the confidence level of the connection between the third party account and the additional third party account is a direct function (e.g., directly proportional) to a number or a percentage of types of information in the third party account having values matching values of the types of information in the additional third party account. In some embodiments, the online system 140 associates different weights with different types of information included in the third party account and determines the confidence level of the connection between the third party account and the additional third party account based at least in part on the weights associated with types of information having matching values in the third party account and in the additional third party account. For example, higher weights are associated with types of information more likely to uniquely identify a user.

In another embodiment, one or more rules applied by the online system 140 establish 315 a connection between the third party account and an additional third party account maintained by a third party system 130 based on a device identifier included in the third party account and a device identifier included in the additional third party account. For example, information included in the third party account by the third party system 130 includes device identifiers received from client devices 110 used by the user associated with the third party account to access the third party system 130, as well as dates and times when the user accessed the third party system 130 from various client devices 110 corresponding to device identifiers. If the third party account includes a device identifier, the online system 140 establishes 315 a connection between the third party account and an additional third party account if a device identifier included in the third party account matches a device identifier included in the additional account that is associated with a most recent date or time or that is associated with a date and time within a threshold interval of a current time. Various rules may specify the threshold interval from the current time associated with a device identifier in the third party account for the online system 140 to establish 315 a connection with an additional third party account including the device identifier.

Alternatively or additionally, the online system 140 compares Internet Protocol addresses associated with the third party account maintained by the third party system 130 and Internet Protocol addresses associated with one or more additional third party accounts stored by one or more additional third party systems 130 and establishes 315 a connection between the third party account maintained by the third party system 130 and an additional third party account maintained by an additional third party system 130 based on the comparison. In one embodiment, the online system 140 identifies an overlap sequence of Internet Protocol addresses associated with multiple occurrences of the identifier of the third party account and multiple occurrences in information associated with the additional third party account during a time period (e.g., a number of times information describing interactions by the additional third party account with client devices 110 having the Internet Protocol addresses). Both the third party system 130 and the additional third party system 130 may associate Internet Protocol addresses of client devices 110 with interactions by the third party account or by an additional third party account. The online system 140 determines an overlap score based on the identified overlap sequence of Internet Protocol addresses, with the overlap score providing a measure of how closely information from an additional third party account is associated with a third party identifier of an additional third party account. In one embodiment, the online system 140 determines the overlap score based on the number of times the identifier of the third party account and information from the additional third party account are both associated with the same Internet Protocol address during a time period. The online system 140 establishes 315 a connection between the third party account and the additional third party account with the confidence level of the connection based on the overlap score, with a higher overlap score resulting in a higher confidence level in various embodiments. Identifying an overlap sequence and determining an overlap score is further described in U.S. patent application Ser. No. 14/641,256, filed on Mar. 6, 2015, which is hereby incorporated by reference in its entirety.

In other embodiments, the online system 140 identifies a cluster of client devices 110 or applications that communicate with a third party system 130 maintaining a third party account using a common Internet Protocol address during a specified time interval. For example, the online system 140 identifies an association between a cluster of client devices 110 and the third party account by identifying a cluster of client devices 110 from information stored by a third party system 130 that identifies Internet Protocol addresses associated with the third party account. The online system 140 retrieves information stored by a third party system 130 identifying Internet Protocol addresses of client devices 110 in association with the third party account and retrieves information stored by one or more additional third party systems 130 identifying Internet Protocol addresses of client devices 110 in association with one or more additional third party accounts and identifies candidate clusters of client devices 110 from the information retrieved from the third party system 130 and from the one or more additional third party systems 130. For each Internet Protocol address in the information retrieved from the third party system 130, the online system 140 determines client devices 110 associated with the Internet Protocol addresses and times when the client devices 110 communicated with the third party system 130 using the Internet Protocol addresses. Similarly, the online system 140 determines client devices 110 associated with the Internet Protocol addresses and times when the client devices communicated with an additional third party system 130 using the Internet Protocol addresses. The online system 140 identifies the usage time periods for each of the client devices 110 (i.e., time periods when a client device 110 communicated with the third party system 130 or time periods when a client device 110 communicated with the additional third party system 130) associated with the Internet Protocol addresses and identifies candidate clusters of client devices 110. A candidate cluster of client devices 110 is a group of client devices 110 associated with an Internet Protocol address and associated with usage time periods that overlap by at least a threshold amount.

From the candidate clusters of client devices 110, the online system 140 identifies one or more stable clusters of client devices 110. A stable cluster of client devices 110 is a cluster of client devices 110 for which the third party system 130 or the additional third party system 130 has maintained times identifying communications with the client devices 110 in the cluster for at least a threshold length of time. The online system 140 identifies a third party account associated with a stable cluster of client devices 110 and an additional third party account maintained by the additional third party system 130 and establishes 315 a connection between the third party account and the additional third party maintained by an additional third party system 130 account if one or more Internet Protocol addresses in the stable cluster associated with communications between the additional third party system 140 and the additional third party account match Internet Protocol addresses in the stable cluster of client devices 110 associated with the third party account. Determining clusters of client devices 110, identifying stable clusters of client devices 110, and identifying an account associated with a stable cluster of client devices 110 is further described in described in U.S. patent application Ser. No. 14/641,256, filed on Mar. 6, 2015, which is hereby incorporated by reference in its entirety.

The confidence level included in a connection established 315 between the third party account maintained by the third party system 130 and an additional third party account maintained by an additional third party system 130 may be differently determined by the online system 140 depending on the method used by the online system 140 to establish 315 the connection. Additionally, the confidence level may identify the information from the third party account and from the additional third party account used by the online system 140 to establish 315 the connection. For example, the confidence level included in a connection identifies types of information having matching values in the third party account and in an additional third party account between which a connection was established 315. The confidence level included in a connection may identify a method used by the online system 140 to establish 315 the connection. In some embodiments, the online system 140 decreases the confidence level included in a connection between the third party account and an additional third party account over time. For example, the online system 140 applies a decay factor to the confidence level included in the connection between the third party account and the additional third party account, reducing the confidence level as time elapses from a time when the connection was established 315.

In various embodiments, the online system 140 retrieves information associated with accounts maintained by the online system 140 and compares the retrieved information to information associated with one or more third party accounts maintained by one or more of the identified third party systems 130. In one embodiment, the online system 140 retrieves information associated with an account from the online system 140 and obtains information associated with one or more third party accounts maintained a third party system 130. For various third party accounts maintained by a third party system 130, the online system 140 compares information associated with the account maintained by the online system 140 to information associated with a third party account maintained by the third party system 130 and accessible to the online system 140. Based on the comparison, the online system 140 establishes 320 a connection between the account and the third party account maintained by the third party system 130. The established connection includes a confidence level of the user associated with the account maintained by the online system 140 matching a user associated with the third party account maintained by the third party system 130. Hence, the confidence level provides a measure of a likelihood of the user associated with the account being the same individual or entity as the user associated with the third party account maintained by the third party system 130. In some embodiments, the online system 140 does not establish 320 a connection between an account maintained by the online system 140 and a third party account unless the confidence level of the connection equals or exceeds a threshold value; hence, the online system 140 may not establish 320 connections between an account maintained by the online system 140 and third party accounts having less than a threshold likelihood of being associated with the same user as the account maintained by the online system 140.

Various methods may be used by the online system 140 to establish 320 a connection between an account maintained by the online system 140 and a third party account maintained by a third party system 130. In various embodiments, the online system 140 applies one or more rules to information from the selected account and information accessible to the online system 140 from the third party account. For example, the online system 140 and the third party system 130 synchronize, or match, an identifier associated with the account and a third party identifier associated with the third party account based on information stored on a client device 110 by the online system 140 and by the third party system 130. The online system 140 may store an identifier associated with the account, such as a cookie associated with the account, on a client device 110. Similarly, the third party system 130 may store a third party identifier associated with the third party account, such as a cookie associated with the third party account, on the client device 110. When the user associated with the account maintained by the online system 140 retrieves content including a tracking mechanism from the third party system 130, the client device 110 executes the tracking mechanism and communicates a request to the third party system 130 that includes the identifier associated with the third party account stored on the client device 110. In response to receiving the request, the third party system 130 communicates a redirect request to the client device 110 for the client device 110 to communicate a request to the online system 140. The redirect request includes the identifier associated with the third party account stored on the client device 110 (e.g., includes a cookie stored on the client device 110 by the third party system 130). When the client device 110 communicates the request to the online system 140 specified by the redirect request, the request communicated from the client device 110 to the online system 140 includes the identifier associated with the account maintained by the online system 140 that was stored on the client device 110 by the online system 140 (e.g., a cookie stored on the client device 110 by the online system 140). Additionally, the request communicated from the client device 110 to the online system 140 includes the identifier associated with the third party account stored on the client device 110 obtained from the redirect request. Hence, the online system 140 may extract the identifier associated with the third party account stored on the client device 110 from the request communicated to the online system 140 from the client device 110 and associate the identifier associated with the third party account stored on the client device 110 with the identifier of the account maintained by the online system 140 that was stored on the client device 110 by the online system 140 that is included in the request communicated from the client device 110 to the online system 140. The online system 140 establishes 320 a connection between the account maintained by the online system 140 and the third party account by storing an association between the identifier associated with the third party account stored on the client device 110 with the identifier of the account stored on the client device 110 by the online system 140 based on the request from the client device 110. For example, the redirect request from the third party system 130 to the client device 110 includes a cookie associated with the third party account by the third party system 130, which is included in the request from the client device 110 to the online system 140 that also includes a cookie associated with the account by the online system 140.

Additionally, the online system 140 may establish 320 connections between accounts maintained by the online system 140 and third party accounts maintained by various third party system 130 using the methods further described above for establishing 315 connections between third party accounts and additional third party accounts. For example, the online system 140 compares information in an account maintained by the online system 140 to information in a third party account accessible to the online system 140 and establishes 320 a connection between the account maintained by the online system 140 and the third party account based on the comparison, with the confidence level included in the connection based at least in part on the comparison. As further described above, the confidence level may be based on types of information in the account maintained by the online system 140 matching types of information included in the third party account. The confidence level included in a connection between an account maintained by the online system 140 and a third party account may also be based on an amount or a percentage of information included in the account maintained by the online system 140 matching information included in the third party account, as further described above. Further, device identifiers included in an account maintained by the online system 140 and included in a third party account may be compared or Internet Protocol addresses associated with the account maintained by the online system 140 and associated with the third party account may be compared, as further described above, to establish 320 a connection between the account maintained by the online system 140 and the third party account 130. Hence, the online system 140 establishes 315 connections between third party accounts maintained by various third party systems 130 and may establish 320 connections between accounts maintained by the online system 140 and third party accounts maintained by various third party systems 130.

Figure 5:
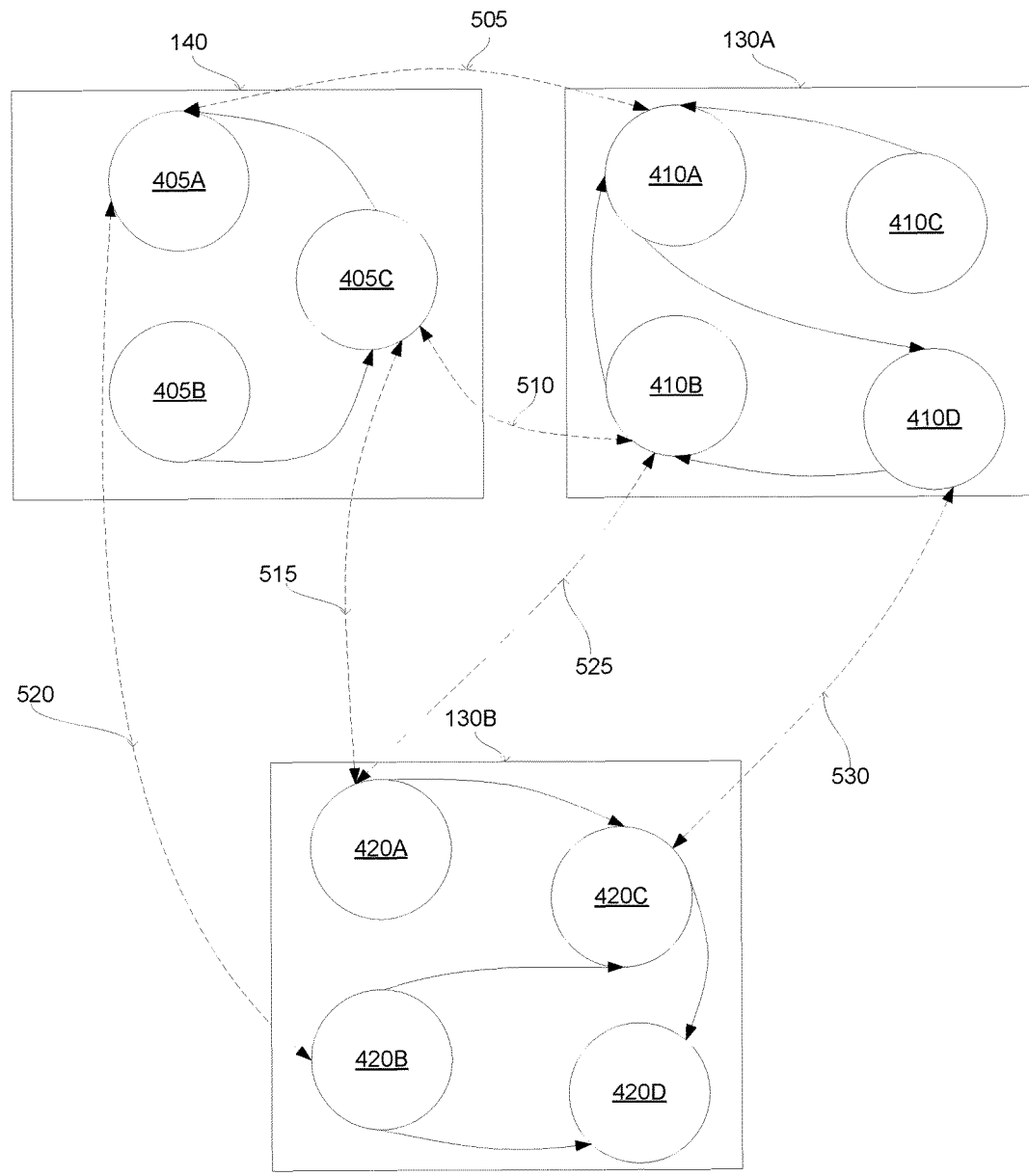
FIG. 5 is a conceptual diagram of connections established between accounts maintained by an online system and third party accounts maintained by various third party systems, in accordance with an embodiment.

FIG. 5 shows a conceptual diagram of an example of connections established between accounts maintained by an online system 140 and third party accounts maintained by various third party systems 130. In the example of FIG. 5, the online system 140 maintains accounts 405A, 405B, 405C, as described above in conjunction with FIG. 4. Similarly, third party system 130A maintains third party accounts 410A, 410B, 410C, 410D, and third party system 130B maintains accounts 420A, 420B, 420C, 420D, also as described above in conjunction with FIG. 4. In FIG. 5, the online system 140 has established a connection 505 between account 405A and third party account 410A, maintained by third party system 130A, and has established a connection 510 between account 405C and third party account 410B, which is maintained by third party system 130A. Similarly, online system 140 also established a connection 515 between account 405C and third party account 420A, maintained by third party system 130B, and established a connection 520 between account 405A and third party account 420B, which is maintained by third party system 130B.

As described above in conjunction with FIG. 4, accounts 405A, 405B, 405C maintained by the online system 140 are associated with identifiers that differ from third party identifiers associated with third party accounts 410A, 410B, 410C, 410D by third party system 130A and that differ from third party identifier associated with third party accounts 420A, 420B, 420C, 420D by third party system 130B. However, the online system 140, third party system 130A, and third party system 130B may exchange certain information in accounts or in third party accounts, respectively, with each other. To allow the online system 140 to retrieve information associated with a user corresponding to an account 405 from a third party account 410, 420 corresponding to the user, the online system 140 establishes the connections between an account and one or more third party accounts 410, 420 shown in FIG. 5. Additionally, third party system 130A may establish a connection 525 between third party account 410B and third party account 420A maintained by third party system 130B, as well as establish a connection 530 between third party account 410D and third party account 420C maintained by third party system 130B, using the method described in conjunction with FIG. 3.

As described above in conjunction with FIG. 3, to establish the connection 505 between account 405A and third party account 410A, the online system 140 retrieves information in the account 405 and information in the third party account 410A that is accessible to the online system 140. Applying one or more rules to a comparison of information in the account 405 to information in the third party account 410 allows the online system 140 to establish the connection 505 based on information in the account 405 having values matching information in the third party account 410. Various methods, such as those described above in conjunction with FIG. 3 may be used to identify information in the account 405 and in the third party account 410A for comparison and for establishing the connection 505 based on the comparison.

The connection 505 includes a confidence level determined by the online system 140 that represents a probability of the account 405A and the third party account 410A being associated with the same user of the online system 140. The confidence level may be determined in part on a method used by the online system 140 to establish the connection 505 or on types of information used to establish the connection 505. For example, the connection 505 is established based on certain information in account 405A matching information in third party account 410A, causing the connection 505 to include a larger confidence value than the connection 520, which was established based an overlap score based on a number of times the identifier of account 405A was associated with an Internet Protocol address that was also associated with account 420B during a time period. As further described below in conjunction with FIG. 3, the connection 505 between the account 405A and the third party account 410A allows the online system 140 to retrieve information from the third party account 410A to augment information included in the account 405A, as the online system 140 determined that there is a likelihood of third party account 410A being associated with the same user of the online system 140 as account 405A.

Referring back to FIG. 3, the online system 140 also maintains one or more rules limiting access by third party systems 130 to information included in accounts maintained by the online system 140 and limiting access by the online system 140 to information included in third party accounts maintained by various third party systems 130. For example, a rule prevents the online system 140 from providing a third party system 130 with information included in an account maintained by the online system 140 capable of uniquely identifying a user associated with the account, while allowing the online system 140 to provide the third party system 130 with Internet Protocol addresses, device identifiers, and actions associated with the account maintained by the online system 140. As another example, a rule prevents the online system 140 from receiving information included in a third party account maintained by a third party system 130. Rules may be modified by the online system 140 or by a third party system 130 that provided the rule to the online system 140 to modify access to information included in accounts or in third party accounts by the online system 140 or by various third party systems 130. Rules may be received from various third party systems 130, generated by the online system 140, received from an entity associated with the online system 140 and with one or more third party systems 130, or received from any other suitable source.

In various embodiments, after establishing 315 connections between one or more third party accounts and one or more additional third party accounts maintained by third party systems 130 and establishing 320 connections between accounts maintained by the online system 140 and third party accounts maintained by one or more third party systems 130, the online system 140 generates 325 one or more clusters based on the confidence levels included in connections between third party accounts or between accounts maintained by the online system 140. A cluster includes a third party account associated with a user and additional third party accounts associated with the user associated with the third party account, and may also include an account maintained by the online system 140 associated with the user associated with the third party account. Similarly, a cluster may include an account maintained by the online system 140 and one or more third party accounts associated with a user associated with the account maintained by the online system 140. Hence, a cluster includes third party accounts associated with a common user, and may also include an account maintained by the online system 140 that is also associated with the common user. To generate the one or more clusters, the account association module 230 may apply any suitable clustering method to the connections between third party accounts and between accounts maintained by the online system 140 that is based on confidence levels include in connections between third party accounts or between third party accounts and accounts maintained by the online system 140. In various embodiments, the online system 140 may apply any suitable clustering method to the connections between third party accounts and between accounts maintained by the online system 140 and third party accounts to generate 325 the one or more clusters, so a cluster includes accounts or third party accounts that are similar to each other. For example, the online system 140 applies one or more graph based cluster models to the connections between third party accounts or between third party accounts and accounts maintained by the online system 140 and the confidence levels included in the connections between third party accounts or between third party accounts and accounts maintained by the online system 140 to generate 325 the one or more clusters.

The online system 140 stores 330 the generated clusters, allowing identification of additional third party accounts associated with a common user as a third party account by identifying additional third party accounts included in a cluster that includes the third party account. Similarly, the online system 140 identifies one or more third party accounts associated with a user who is associated with an account maintained by the online system 140 by identifying one or more third party accounts included in a cluster that includes the account maintained by the online system 140. Identifying third party accounts or accounts maintained by the online system 140 in a stored cluster allows the online system 140 to provide a third party system 130 maintaining a third party account in the stored cluster with information from an additional third party systems 130 maintaining an additional third party account in the stored cluster. For example, if the online system 140 receives information describing actions performed by an online system user, the online system 140 provides information describing the actions to one or more third party systems 130 maintaining third party accounts included in a cluster including an account maintained by the online system 140 for the user. This allows the third party systems 130 to maintain additional information describing user actions that were not identified to the third party systems 130 in various third party accounts. Similarly, if a third party system 130 receives information describing an action performed by a user associated with a third party account maintained by the third party system 130, the third party system 130 may communicate information describing the action to additional third party systems 130 that maintain additional third party accounts included in the cluster including the third party account or to the online system 140, if an account maintained by the online system 140 is included in the cluster including the third party account. Communicating information between third party systems 130 and the online system 140 maintaining third party accounts or accounts, respectively, included in a cluster allows the third party systems 130 to exchange information about a user with each other and with the online system 140 allowing the third party systems 130 or the online system 140 to leverage information associated with other third party accounts or accounts included in a cluster.

For example, the online system 140 selects content for presentation to a e user associated with an account maintained by the online system 140 based on data associated with one or more third party accounts (e.g., identified actions, demographic information, preferences) maintained by third party accounts included in a cluster that includes the account maintained by the online system 140. This allows the online system 140 leverage data captured by a third party account maintained by a third party system 130 and provided by the third party system 130 to the online system 140 when selecting content for a user associated with an account maintained by the online system 140 included in a cluster that also includes the third party accounts. Similarly, a third party system 130 may use information provided from another third party system 130 or from the online system 140 select content for a user associated with a third party account included in a cluster that includes one or more other third party accounts or an account from the online system 140. This increases the information used for selecting content by allowing information received or maintained by different third party systems 130 or by the online system 140 to be identified to various third party systems 130 or to the online system 140.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising: maintaining accounts associated with various users of an online system, an account associated with a user including information associated with the user; identifying one or more third party systems, each third party system maintaining third party accounts associated with various users of the third party system and including information associated with the users of the third party system; establishing connections between a third party account maintained by a third party system and one or more additional third party accounts maintained by one or more additional third party systems, a connection between the third party account and an additional third party account based at least in part on information associated with the third party account and information associated with the additional third party account and the connection between the third party account and the additional party account including a confidence level of a user associated with the third party account matching a user associated with the additional third party account; establishing connections between the third party account maintained by the third party system and one or more accounts maintained by the online system, a connection between the third party account and an account maintained by the online system based at least in part on information associated with the third party account and information associated with the account maintained by the online system and the connection between the third party account and the account maintained by the online system including a confidence level of the user associated with the third party account matching a user associated with the account maintained by the online system; generating a cluster including the account maintained by the online system, the third party account, and one or more additional third party accounts based on the confidence level of the user associated with the third party account matching users associated with additional third party accounts and the confidence level of the user associated with the third party account matching the user associated with the account maintained by the online system; and storing the generated cluster, wherein the confidence level included in the connection between the third party account and the account maintained by the online system identifies types of information having matching values in the third party account and in the account maintained by the online system.

2. The method of claim 1, further comprising: receiving information identifying an action associated with the third party account included in the cluster; and storing information describing the action in association with the account maintained by the online system included in the cluster and in association with the one or more additional third party accounts included in the cluster.

3. The method of claim 1, further comprising: receiving information identifying an action associated with an additional third party account included in the cluster; and storing information describing the action in association with the account maintained by the online system included in the cluster and in association with the third party account included in the cluster.

4. The method of claim 1, further comprising: receiving information identifying an action associated with the account maintained by the online system included in the cluster; and storing information describing the action in association with the one or more additional third party accounts included in the cluster and in association with the third party account included in the cluster.

5. The method of claim 1, further comprising: selecting content for presentation to the user associated with the account maintained by the online system based on data associated with the third party account included in the cluster by the third party system or data associated with one or more of the additional third party accounts included in the cluster by the one or more additional third party systems.

6. The method of claim 1, wherein establishing connections between the third party account maintained by the third party system and one or more additional third party accounts maintained by one or more additional third party systems comprises: retrieving information from the third party account accessible to the online system by one or more maintained rules associated with the third party system; retrieving information from the third party account accessible to the online system by one or more maintained rules associated with the additional third party system; comparing the retrieved information from the third party account to information retrieved from the additional third party account; and applying one or more rules based on the comparison to establish the connection between the third party account and the additional third party account maintained by the additional third party system.

7. The method of claim 1, wherein establishing connections between the third party account maintained by the third party system and one or more accounts maintained by the online system comprises: retrieving information from the third party account accessible to the online system by one or more maintained rules associated with the additional third party system; comparing the retrieved information from the third party account to information included in the account maintained by the online system; and applying one or more rules based on the comparison to establish the connection between the third party account maintained by the third party system and the account maintained by the online system.

8. The method of claim 1, wherein the confidence level included in the connection between the third party account and the additional third party account identifies types of information having matching values in the third party account and in the additional third party account.

9. The method of claim 1, wherein the confidence level included in the connection between the third party account and the additional third party account is based at least in part on types of information having matching values in the third party account and in the additional third party account.

10. The method of claim 1, wherein the confidence level included in the connection between the third party account and the account maintained by the online system is based at least in part on types of information having matching values in the third party account and in the account maintained by the online system.

11. A computer program product comprising a non-transitory computer readable storage medium having instructions encoded thereon that, when executed by a processor, cause the processor to: maintain accounts associated with various users of an online system, an account associated with a user including information associated with the user; identify one or more third party systems, each third party system maintaining third party accounts associated with various users of the third party system and including information associated with the users of the third party system; establish connections between a third party account maintained by a third party system and one or more additional third party accounts maintained by one or more additional third party systems, a connection between the third party account and an additional third party account based at least in part on information associated with the third party account and information associated with the additional third party account and the connection between the third party account and the additional party account including a confidence level of a user associated with the third party account matching a user associated with the additional third party account; establish connections between the third party account maintained by the third party system and one or more accounts maintained by the online system, a connection between the third party account and an account maintained by the online system based at least in part on information associated with the third party account and information associated with the account maintained by the online system and the connection between the third party account and the account maintained by the online system including a confidence level of the user associated with the third party account matching a user associated with the account maintained by the online system; generate a cluster including the account maintained by the online system, the third party account, and one or more additional third party accounts based on the confidence level of the user associated with the third party account matching users associated with additional third party accounts and the confidence level of the user associated with the third party account matching the user associated with the account maintained by the online system; and store the generated cluster, wherein the confidence level included in the connection between the third party account and the account maintained by the online system identifies types of information having matching values in the third party account and in the account maintained by the online system.

12. The computer program product of claim 11, wherein the computer readable storage medium further has instructions encoded thereon that, when executed by a processor, cause the processor to: receive information identifying an action associated with the third party account included in the cluster; and tore information describing the action in association with the account maintained by the online system included in the cluster and in association with the one or more additional third party accounts included in the cluster.

13. The computer program product of claim 11, wherein the computer readable storage medium further has instructions encoded thereon that, when executed by a processor, cause the processor to: receive information identifying an action associated with an additional third party account included in the cluster; and store information describing the action in association with the account maintained by the online system included in the cluster and in association with the third party account included in the cluster.

14. The computer program product of claim 11, wherein the computer readable storage medium further has instructions encoded thereon that, when executed by a processor, cause the processor to: receive information identifying an action associated with the account maintained by the online system included in the cluster; and store information describing the action in association with the one or more additional third party accounts included in the cluster and in association with the third party account included in the cluster.

15. The computer program product of claim 11, wherein the computer readable storage medium further has instructions encoded thereon that, when executed by a processor, cause the processor to: select content for presentation to the user associated with the account maintained by the online system based on data associated with the third party account included in the cluster by the third party system or data associated with one or more of the additional third party accounts included in the cluster by the one or more additional third party systems.

16. The computer program product of claim 11, wherein establish connections between the third party account maintained by the third party system and one or more additional third party accounts maintained by one or more additional third party systems comprises: retrieve information from the third party account accessible to the online system by one or more maintained rules associated with the third party system; retrieve information from the third party account accessible to the online system by one or more maintained rules associated with the additional third party system; compare the retrieved information from the third party account to information retrieved from the additional third party account; and apply one or more rules based on the comparison to establish the connection between the third party account and the additional third party account maintained by the additional third party system.

17. The computer program product of of claim 11, wherein establish connections between the third party account maintained by the third party system and one or more accounts maintained by the online system comprises: retrieve information from the third party account accessible to the online system by one or more maintained rules associated with the additional third party system; compare the retrieved information from the third party account to information included in the account maintained by the online system; and apply one or more rules based on the comparison to establish the connection between the third party account maintained by the third party system and the account maintained by the online system.

18. The computer program product of claim 11, wherein the confidence level included in the connection between the third party account and the additional third party account is based at least in part on types of information having matching values in the third party account and in the additional third party account.

* * * * *

UNITED STATES PATENT AND TRADEMARK OFFICE
CERTIFICATE OF CORRECTION

PATENT NO. : 9,935,913 B2
APPLICATION NO. : 15/179935
DATED : April 3, 2018
INVENTOR(S) : Liang Xu et al.

Page 1 of 1

It is certified that error appears in the above-identified patent and that said Letters Patent is hereby corrected as shown below:

On the Title Page

Abstract (57), Line 14, after "including" delete "includes".

In the Claims

Column 28, Line 52, after "and" delete "tore" and insert -- store --.

Signed and Sealed this
Nineteenth Day of February, 2019

Andrei Iancu
*Director of the United States Patent and Trademark Office*